March 17, 1942. W. B. HINER 2,276,723
PHOTOGRAPHIC LENS FOR THREE DIMENSIONAL EFFECT
Filed Jan. 2, 1941
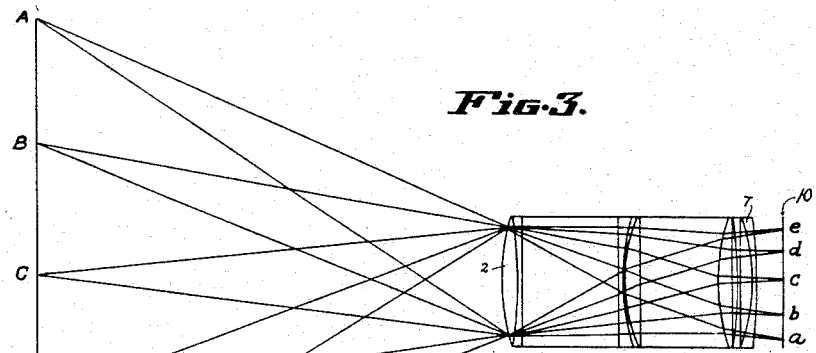
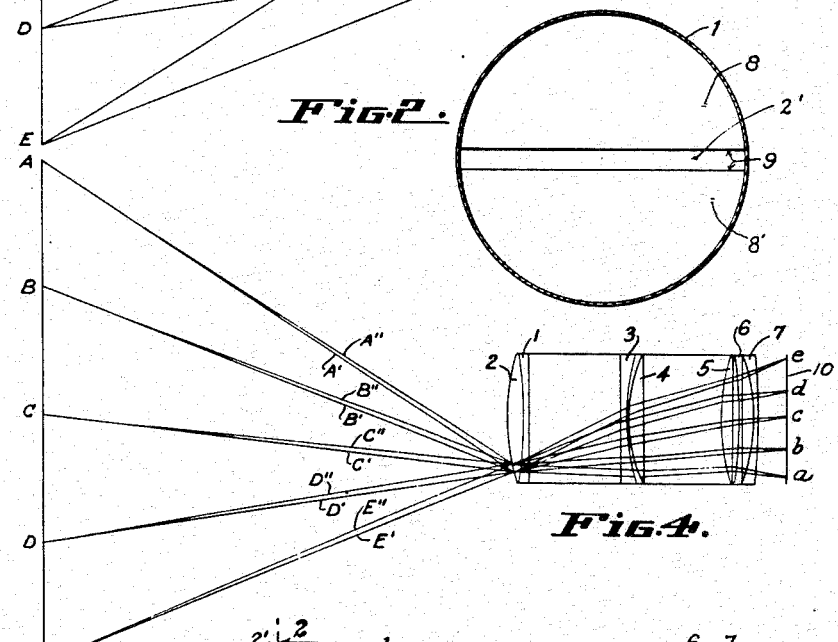
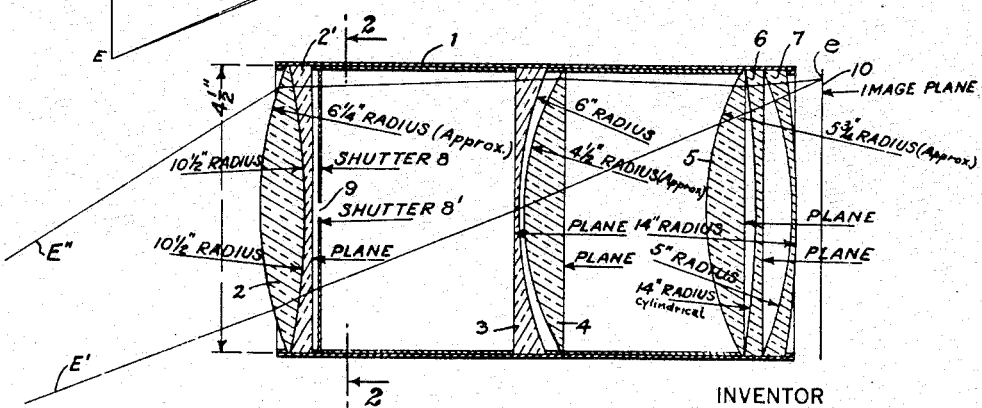
INVENTOR
WILLIAM B HINER
BY
ATTORNEY Patented Mar. 17, 1942

2,276,723

UNITED STATES PATENT OFFICE 2,276,723

PHOTOGRAPHIC LENS FOR THREE DIMENSIONAL EFFECT

William B. Hiner, San Jose, Calif.

Application January 2, 1941, Serial No. 372,843

10 Claims. (Cl. 88—57)

This invention relates to lenses, and the principal object of the invention is to provide a lens which will yield a stereoscopic or three dimensional effect in the picture of an object or view formed by the lens. A further object of the invention is to provide a means of securing a picture or photograph by the use of one lens but which picture or photograph will exhibit decided three dimensional or stereoscopic effect to a person viewing it without the aid of any special apparatus, optical instruments, shutters, screens, etc.

Another object is to provide such a lens which will have good photographic qualities, such as correction for color, spherical aberration, marginal definition, a substantially flat field, etc.

Further objects and advantages of the invention will appear in the following description and accompanying drawing.

In the drawing:

Fig. 1 is a longitudinal and vertical central section of my compound lens shown in relation to a focal plane or screen.

Fig. 2 is a cross section of the lens of Fig. 1 taken along the line 2—2 thereof.

Fig. 3 is a reduced size diagrammatic drawing of the lens of Fig. 1 with light rays from five spaced points or objects drawn as entering the lens at two opposite marginal points only to show their equal distribution across the focal plane.

Fig. 4 is similar to Fig. 3 except that it shows the rays as entering one small marginal area only of the lens and illustrates somewhat the refraction of the rays in passing through the system.

Before describing the drawing in detail it may be stated the invention was based on my discovery that a lens could be ground and corrected for chromatic and spherical aberration, curvilinearity, and curvature of field, etc., so that not only would every individual portion of the area of the lens yield a picture of the whole view or subject completely covering the focal plane, but the marginal rays, or those rays passing from the object through areas at opposite points on the margin of the lens, or in fact at points all around the margin, will produce sharp overlapping coinciding images on the focal plane, and consequently if the lens be of relatively large diameter as compared to ordinary photographic lenses—say about four inches and used wide open, these overlapping views as projected to the focal plane from the diametrically opposite marginal portions of the lens, being received from the object at angles corresponding at least to the angles of view of the two eyes of a person, will similarly yield an effect of rotundity or stereoscopic relief in a photographic print or positive made from a negative taken with the lens.

As a lens of such great diameter would generally permit passage of too much light for proper control of the exposure, and as the horizontal separation of the two points of view are most important in contributing to the effect of binocular vision, I preferably provide a diaphragm or stop having an opening in the form of a narrow slot extending horizontally across the lens, and which horizontal slot-opening, instead of being in a separate diaphragm, may of course be the maximum opening of a shutter of the well-known two bladed type.

In developing my improved lens, I first made the front or object glass of the size (about 4½ inches in diameter) required to yield the desired angle of view from its marginal portions, and thereafter added other lenses of various form and refractive capacity until a careful examination of the image at the focal plane proved coincidence of the views projected from any separated localized areas of the lens. This was done by applying a black paper disk to the front of the lens with two or more small marginal and otherwise positioned holes in it through which the image was projected to the ground glass or screen at the focal plane, and the various holes were alternately shut off; also the disk turned to different positions, while accurate measurements and position marks were made on the screen.

In the drawing, 1 represents the lens tube, 2, the front positive lens, 2' its associated negative lens for chromatic correction, 3 a rearwardly spaced plano-concave negative lens, 4 a plano-convex lens, air spaced from lens 3, 5 a further rearwardly spaced plano-convex lens, 6 a plano-concave lens air spaced from 5, and 7 a concave-meniscus lens air spaced rearwardly from 6.

The diaphragm (or shutter blades) is indicated at 8, 8' and its horizontal open slot is shown at 9, while the focal plane or sensitive photographic surface of the plate or film is indicated at 10.

In the compound lens built, the element 2 is of crown glass, 2' of flint glass, 3 of flint glass, 4 of crown glass, 5 of crown glass, 6 of crown glass, and 7 of crown glass.

In Fig. 1, for example purposes only I have designated the radius dimensions of each element of a 4½ inch diameter compound photographic lens which I have made and which has been found to satisfactorily carry out my invention, but it should be noted that the dimensional figures given are not limiting as I have found considerable variation possible, and sufficient changes of grindings have not been made thus far to determine the variation limits.

A feature of importance is that the front faces of all of the positive lenses 2, 4 and 5 are not spherical, but are made slightly parabolic, this being required to obtain a substantially flat field at the focal plane. All of the other curves are spherical with the exception of the front curved face of plano-concave lens 6 which is cylindrical with the curve extending vertically. The use of this slight cylindrical concave glass with the curve extending vertically makes a sharper image over the whole field when a horizontal slit diaphragm or slit shutter is used. The horizontal slit diaphragm or shutter is spaced as close as practical to the rear side of lens 2'.

The lens may be said to be a compound lens comprising three spaced groups of lens elements, a front or positive achromatic collecting element consisting of glasses 2 and 2' cemented together, a positive rearwardly spaced further chromatic and distortion correcting element consisting of glasses 3 and 4 air spaced, and a positive back group or final distortion rectifying element consisting of the air spaced glasses 5, 6 and 7, the three groups of glasses being spaced apart in the lens tube at distances about equal to their diameters.

In the final form of the test lens as shown in the drawing, and which as stated is 4½ inches in diameter, the focus of the separate groups of lenses from parallel rays (the moon) was found to be: Front combination 11 1/16 inches. Central group 21 13/16 inches. Rear group 33 7/16 inches. All measured from the center of the front face of the particular group. The focus of the whole combination on parallel rays was 9 13/16 inches, as measured from the center of the front face of the front lens, and the lenses in their tube are about 8 1/16 inches from front face to back face. The focal plane is spaced rearwardly of the rear lens generally less than half the diameter of the lens in photographing ordinary views, (about 1 9/32 inches for parallel rays) and the size of the picture produced is substantially no larger than the diameter of the lens. The angle of view included in the test lens was about 40 degrees.

In Fig. 1 a pair of thin lines E', E'' representing light rays emanating from a distant point E (not shown) are shown as diverging from the distant point to enter respectively at opposite margins of the lens 2, and their refraction through the various glasses to final convergence at focal point e on the focal plane 10 is indicated. The path of these rays is assumed to be without the diaphragm 8 in place, or that the slot 9 of the diaphragm is in the plane of the rays so as to permit them to pass through. With the arrangement of glasses shown these rays E', E'' would converge at e no matter which localized area anywhere over the lens surface they might have been confined to in entering.

In Fig. 4 is shown rays emanating from five distant spaced points A, B, C, D and E diverging as at A', A'', B', B'', etc. to enter the lens over a limited area adjacent the lower margin of lens 2, and their final convergence on the focal plane at a, b, c, d and e, and as stated for Fig. 1, these rays would always converge at these same spaced points no matter where the limited area of their entrance to lens 2 were situated on its surface.

In Fig. 3, the diagram depicts in single lines two rays emanating from each point of the object (A to E) and entering the object glass 2 respectively at two spaced limited marginal areas and converging again on the focal plane at points a to e, and it illustrates the two angles of view of each point of the object obtained through these spaced limited marginal areas, and which substantially correspond to the angles of view of the two eyes of a person looking at a similar object. Additional rays of course enter every other part of the lens to form overlying registering images, but if the horizontal diaphragm or shutter slot 9 is used in the lens the images from the two portions of the slot to the right and left of the center of the lens become through their superimposition, paramount factors in giving a three dimensional or stereoscopic effect to a photograph made with the lens, yet the central area is also useful in contributing light and detail.

The larger the diameter of the lens the greater the angles of view obtained from its opposite margins, to build up the stereoscopic quality of the picture, and while it may be thought that any large lens would yield similar results, this is not the case, as the margins of very large lenses are not corrected for inherent photographic faults, nor insofar as I am aware, have any lenses of large enough diameter been made and corrected for their margins to properly cooperate to form sharp coinciding images over the whole focal plane area, or to coincide with an image from the central or more central areas upon a flat focal plane.

Having thus described my improved compound lens, what I claim is:

1. A compound photographic lens comprising an achromatic front positive lens of a diameter large enough to yield from adjacent opposite margins angles of views giving definite stereoscopic effect when combined, a rearwardly spaced achromatizing and distortion correcting and field flattening positive lens, and a positive rear lens combination spaced behind the second lens for further flattening the field, the respective focal lengths of the lenses being substantially in the order of 1, 2 and 3 and each of said lenses including a positive lens element with a parabolic face.

2. A compound photographic lens comprising an achromatic front positive lens of a diameter large enough to yield from adjacent opposite margins angles of views giving definite stereoscopic effect when combined, a rearwardly spaced achromatizing and distortion correcting and field flattening positive lens, and a positive rear lens combination spaced behind the second lens for further flattening the field, the respective focal lengths of the lenses being substantially in the order of 1, 2 and 3 and each of said lenses including a positive lens element with a parabolic face and also a plano-concave negative lens element.

3. A compound photographic lens comprising an achromatic front positive lens of a diameter large enough to yield from adjacent opposite margins angles of views giving definite stereoscopic effect when combined, a rearwardly spaced achromatizing and distortion correcting and field flattening positive lens, and a positive rear lens combination spaced behind the second lens for further flattening the field, the respective focal lengths of the lenses being substantially in the order of 1, 2 and 3 and each of said lenses including a positive lens element with a parabolic face and also a plano-concave negative lens element and the lenses being spaced from each other a distance substantially equal to the diameter of the front lens.

4. A compound photographic lens comprising an achromatic front positive lens of a diameter large enough to yield from adjacent opposite margins angles of views giving definite stereoscopic effect when combined and having a parabolic face, a rearwardly spaced achromatizing and distortion correcting and field flattening positive lens including a positive lens element having a parabolic face, and a positive rear lens combination spaced behind the second lens for further flattening the field, said rear lens combination including a forward positive lens having a parabolic face.

5. A compound photographic lens comprising an achromatic front positive lens of a diameter large enough to yield from adjacent opposite margins angles of views giving definite stereoscopic effect when combined, a rearwardly spaced achromatizing and distortion correcting and field flattening positive lens, and a positive rear lens combination spaced behind the second lens for further flattening the field, said rear lens combination including a forward positive lens, a central plano-cylindrical lens, and a rearward concavo-convex lens, the respective focal lengths of the lenses being substantially in the order of 1, 2 and 3.

6. A compound photographic lens comprising an achromatic front positive lens of about 4½ inches in diameter so as to yield from adjacent opposite margins angles of views giving definite stereoscopic effect when combined, a rearwardly spaced achromatizing and distortion correcting and field flattening positive lens, and a positive rear lens combination spaced behind the second lens for further flattening the field, said rear lens combination including a forward positive lens, a central plano-cylindrical lens, and a rearward concavo-convex lens, the respective focal lengths of the lenses being substantially in the order of 11, 22, and 33 inches.

7. In a compound lens as set out in claim 5, said plano-cylindrical lens having the curve of its surface extending vertically, and means adjacent the front lens forming a slot diaphragm with the slot extending horizontally across the lens.

8. A compound photographic lens as set out in claim 2 in which the lenses are all substantially the same diameter.

9. A compound photographic lens as set out in claim 3 in which the lenses are all substantially the same diameter.

10. A compound photographic lens as set out in claim 3 in which the lenses are all substantially the same diameter and the combined focal length and angle of view is such as to form a picture at the focal plane substantially no larger than the diameter of the lens.

WILLIAM B. HINER.